Dec. 19, 1922.

H. DULZ.
LOCKING DEVICE FOR CAR DOORS.
FILED MAR. 12, 1921.

1,439,357

Inventor
Herman Dulz
By Whittemore Hulbert Whittemore
& Belknap
Attorneys

Patented Dec. 19, 1922.

1,439,357

UNITED STATES PATENT OFFICE.

HERMAN DULZ, OF DETROIT, MICHIGAN, ASSIGNOR OF ONE-FOURTH TO DICK HAVHANASEAN, OF DETROIT, MICHIGAN.

LOCKING DEVICE FOR CAR DOORS.

Application filed March 12, 1921. Serial No. 451,913.

*To all whom it may concern:*

Be it known that I, HERMAN DULZ, a citizen of the United States of America, residing at Detroit, in the county of Wayne and State of Michigan, have invented certain new and useful Improvements in Locking Devices for Car Doors, of which the following is a specification, reference being had therein to the accompanying drawings.

The invention relates to locking devices for car doors and particularly to the sliding type of door. The main object of the invention is the provision of a locking device engageable with the rear edge of the sliding door and operable from a position such that a single operator is not able to release the device and at the same time open the door. With this object in view, the invention resides in the novel features of construction and combinations and arrangements of parts as more fully hereinafter set forth.

Figure 1:
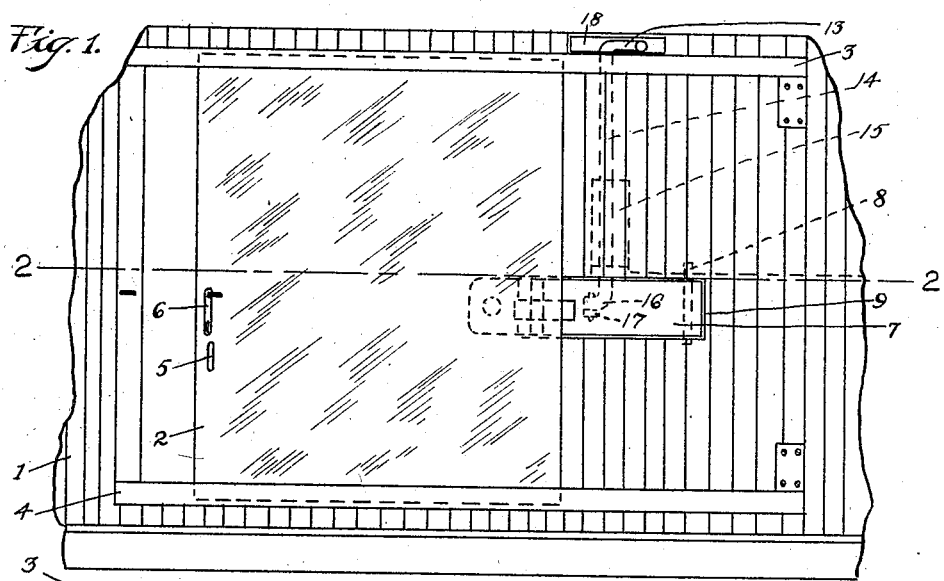
Figure 1 is a side elevation of a portion of a car body with my locking device applied.

1 is the side of the car body and 2 the door slidably mounted in the upper and lower guides 3 and 4 respectively secured to the side 1. 5 is a handle at the forward edge of the door for opening the same, and 6 the hasp which is commonly used to lock the door in closed position.

My locking device comprises the locking member 7 engageable with the rear edge of the door 2 and pivotally mounted upon the side 1 of the car body as at 8, this locking member being located within the elongated slot 9 in the side 1. For yieldably maintaining the locking member 7 in its outermost or locking position, there is the coil spring 10 surrounding the bolt 11 which extends inwardly from the side 1, this coil spring abutting the inner side of the locking member 7 near its free end and also the nut 12 upon the bolt. To swing the locking member 7 from its locking position, there is the crank arm 13 extending outwardly from the car body and connected to the locking member by suitable means, which in the present instance comprises the shaft 14 integral with the crank arm 13 and rotatably mounted in the bearing 15 upon the side 1, the rock arm 16 at the opposite end of the shaft 14 and integral therewith, and the link 17 between the free end of the rock arm 16 and the locking member.

Figure 3:
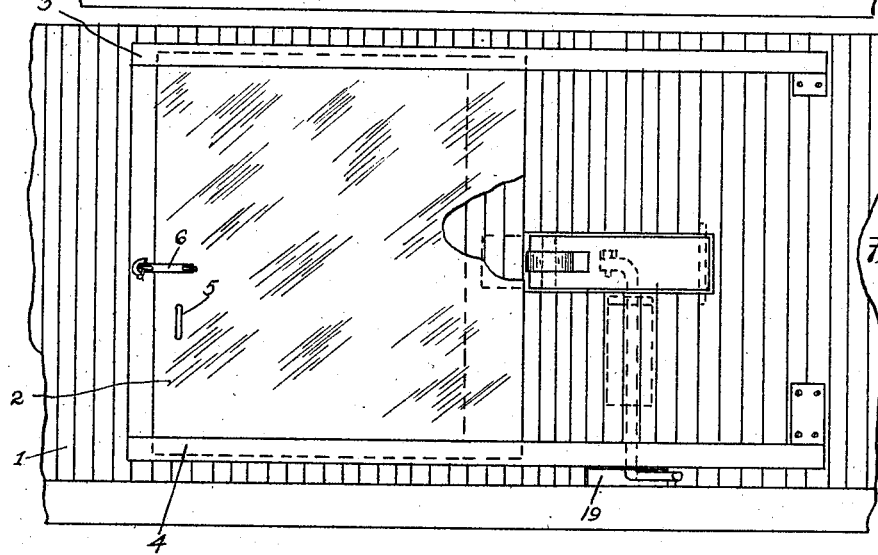
Figure 3 is a view similar to Figure 1 showing a modified construction.
Figure 2:
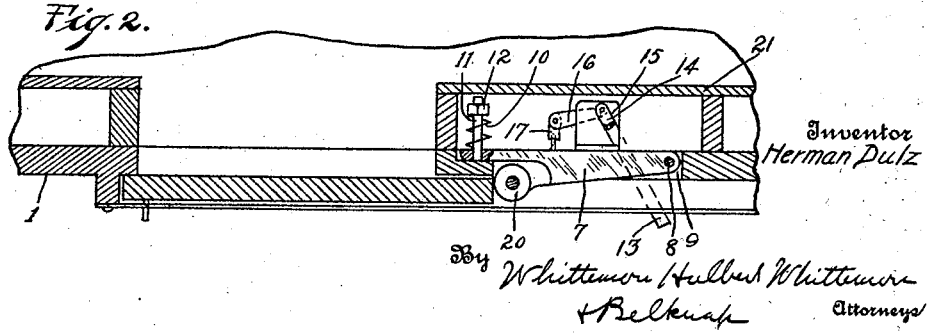
Figure 2 is a cross section on the line 2—2 of Figure 1.

For the purpose of making it practically impossible for one person to release the locking device as well as open the car door, the crank arm 13 is positioned at a distance from the handle 5 upon the door. As shown in Figure 1, this crank arm 13 extends outwardly from the car body through an aperture 18 in the side 1 near the eave, while as shown in Figure 3, the crank arm extends outwardly through an aperture 19 in the side 1 near the bottom.

In order to decrease the friction between the locking member 7 and the door 2 when moving thereover, the locking member has the roller 20 pivotally mounted in its locking end and extending outwardly therebeyond, so that upon sliding the door, its inner surface engages the roller.

Another feature is the location of the lock operating mechanism within the car body with the exception of the outer end of the crank arm and the outer portion of the locking member, this mechanism being enclosed between the inner lining 21 and the side 1 of the car body to protect the same.

From the above description it will be readily seen that I have provided a simple construction of locking device for sliding car doors which will prevent one person operating both the device and door to secure entrance into the car. Also, due to the positions of the crank arms, which are operable to release the locking device, a person operating the same can be more readily seen. Furthermore, my locking member performs the function of the cleat which is usually nailed to the side of the car adjacent to the rear edge of the door.

What I claim as my invention is:

1. The combination with a car body, of a sliding door, means within said car body engageable with the rear edge of said door to lock the same in closed position, and manually operable means extending outwardly through said car body for releasing said locking means operable from a position near an edge of the car body side.

2. The combination with a car body, of a sliding door, a locking member within said car body engageable with the rear edge of said door and pivotally mounted upon said car body, and means extending outwardly through said car body for swinging said locking member to unlock said door, said means being operable from a position near an edge of the car body side.

3. The combination with a car body, of a sliding door, a locking member within said car body engageable with the rear edge of said door and pivotally mounted upon said car body, means for yieldably maintaining said locking member in locking position, and an arm extending outwardly through said car body near one of its corners and connected to said locking member to move the same from locking position.

4. The combination with a car body, of a sliding door, a locking member within said car body engageable with the rear edge of said door and pivotally mounted upon said car body, a spring engageable with said locking member for retaining the same in locking position, and a crank arm extending outwardly through said car body near its roof and connected to said locking member to move the same from locking position.

5. The combination with a car body, of a sliding door, a locking member pivotally mounted within said car body and movable outwardly to engage the rear edge of said door, a spring within said car body for yieldably maintaining said locking member in its locking position, a crank arm extending outwardly through said car body, connections between said crank arm and locking member for moving the latter from locking position upon movement of the former, and an inner lining for said car body protecting said connections.

6. The combination with a car body, of a sliding door, a spring influenced member pivotally mounted within said car body normally engaging the rear edge of said sliding door, and means extending through said car body at a distant point from the forward edge of said door for operating the member aforesaid.

In testimony whereof I affix my signature.

HERMAN DULZ.